United States Patent [19]

Tucek

[11] 4,034,785

[45] July 12, 1977

[54] DELIMBING ATTACHMENT FOR TREE HARVESTING APPARATUS

[75] Inventor: Frank J. Tucek, Wausau, Wis.

[73] Assignee: J. I. Case Company, Racine, Wis.

[21] Appl. No.: 613,418

[22] Filed: Sept. 15, 1975

Related U.S. Application Data

[62] Division of Ser. No. 517,461, Oct. 24, 1974, Pat. No. 3,939,886.

[51] Int. Cl.² .................................. A01G 23/08
[52] U.S. Cl. .............................. 144/2 Z; 144/3 D; 144/309 AC
[58] Field of Search ............... 144/2 Z, 3 D, 34 R, 144/34 E, 309 AC; 83/928

[56] References Cited

U.S. PATENT DOCUMENTS

| | | | |
|---|---|---|---|
| 3,414,027 | 12/1968 | Larva, Sr. et al. | 144/3 D X |
| 3,500,882 | 3/1970 | Tanguay | 144/3 D |
| 3,643,708 | 2/1972 | Lindbloom | 144/2 Z |
| 3,717,185 | 2/1973 | Moser et al. | 144/2 Z |
| 3,735,788 | 5/1973 | Coughran, Jr. | 144/3 D X |
| 3,763,905 | 10/1973 | Hamilton et al. | 144/2 Z |
| 3,797,539 | 3/1974 | Moser et al. | 144/2 Z X |

Primary Examiner—Othell M. Simpson
Assistant Examiner—W. D. Bray
Attorney, Agent, or Firm—Dressler, Goldsmith, Clement, Gordon & Shore, Ltd.

[57] ABSTRACT

Apparatus for harvesting, delimbing and cutting trees into sections is disclosed herein. The harvesting apparatus includes grapple means and cutter means on a mast which is supported on a boom of a vehicle. The delimbing and cutting into sections is accomplished with a separate frame that may be in the form of a trailer processor attached to the vehicle and positioned so that the mast and boom may be utilized for forcing the tree into engagement with a tree advancing mechanism on the trailer and the cutter means on the mast may be utilized to cut the delimbed tree into sectons. The system is also designed so that the hydraulic circuitry for driving the vehicle may be used as the power source for the processor.

3 Claims, 7 Drawing Figures

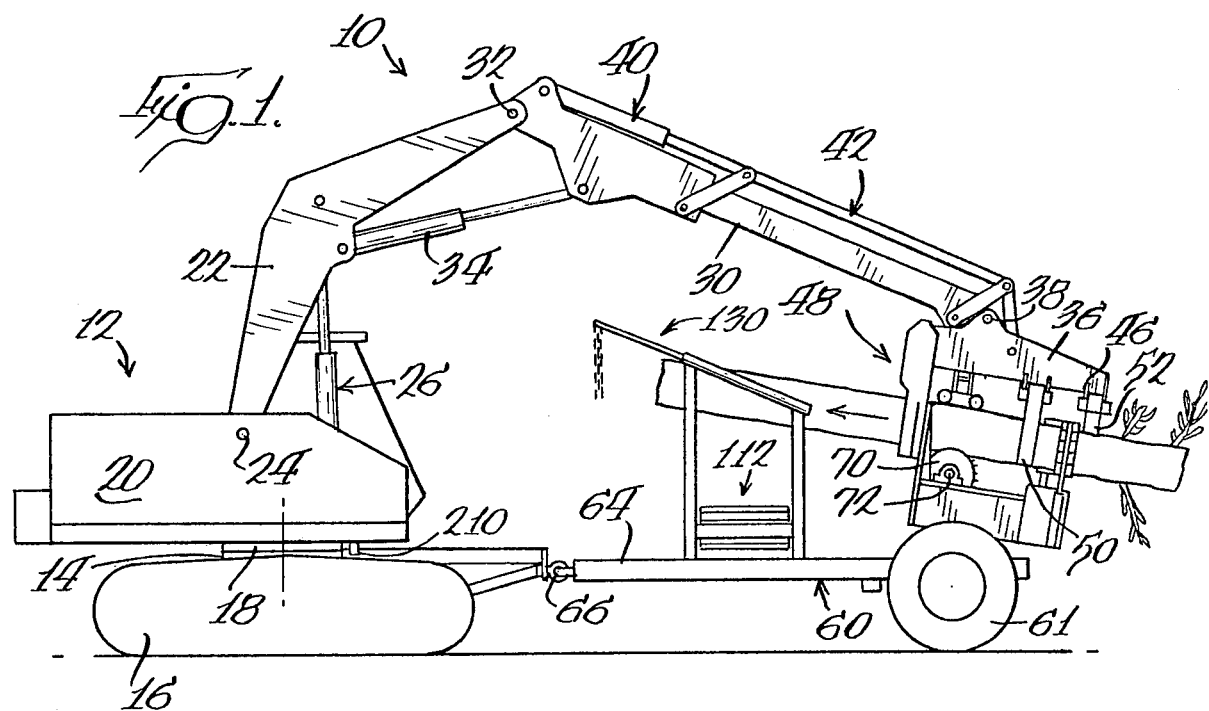
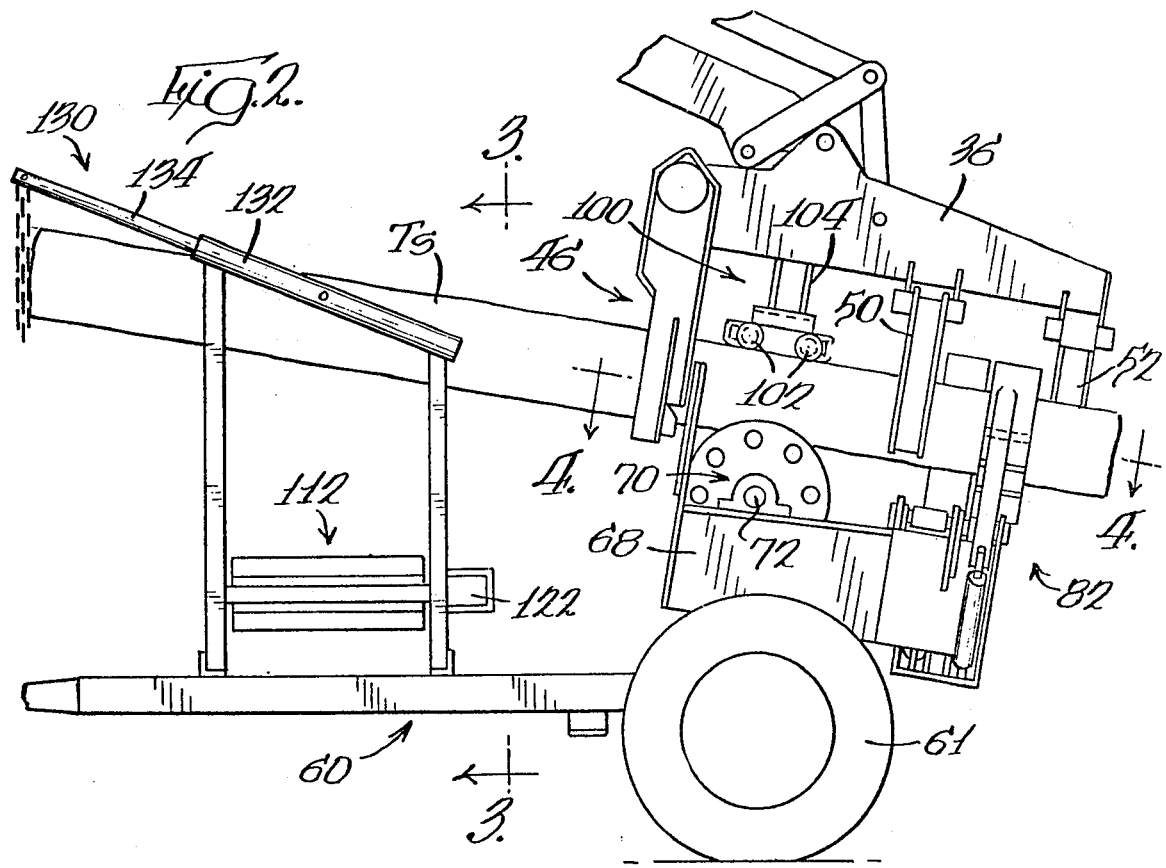

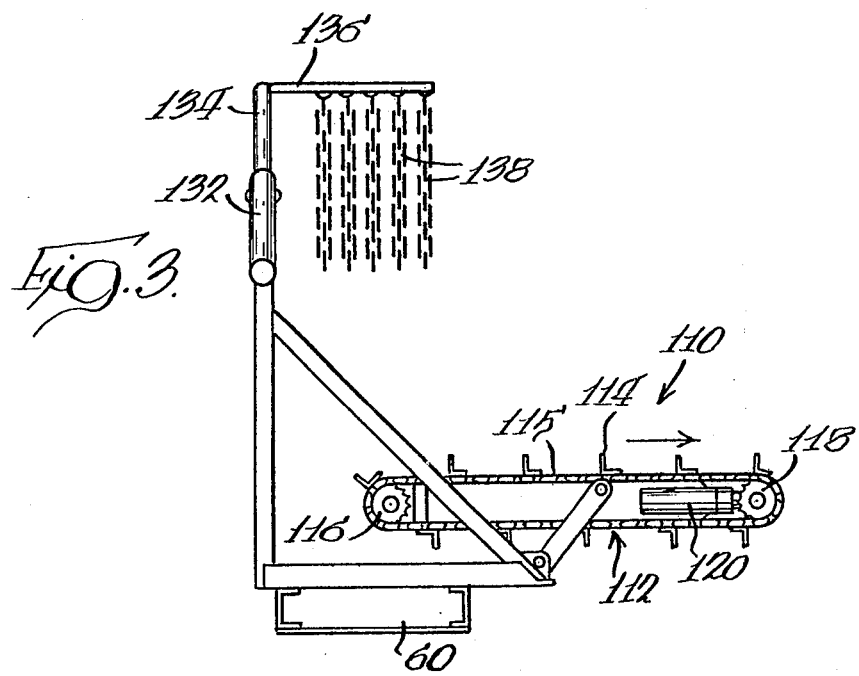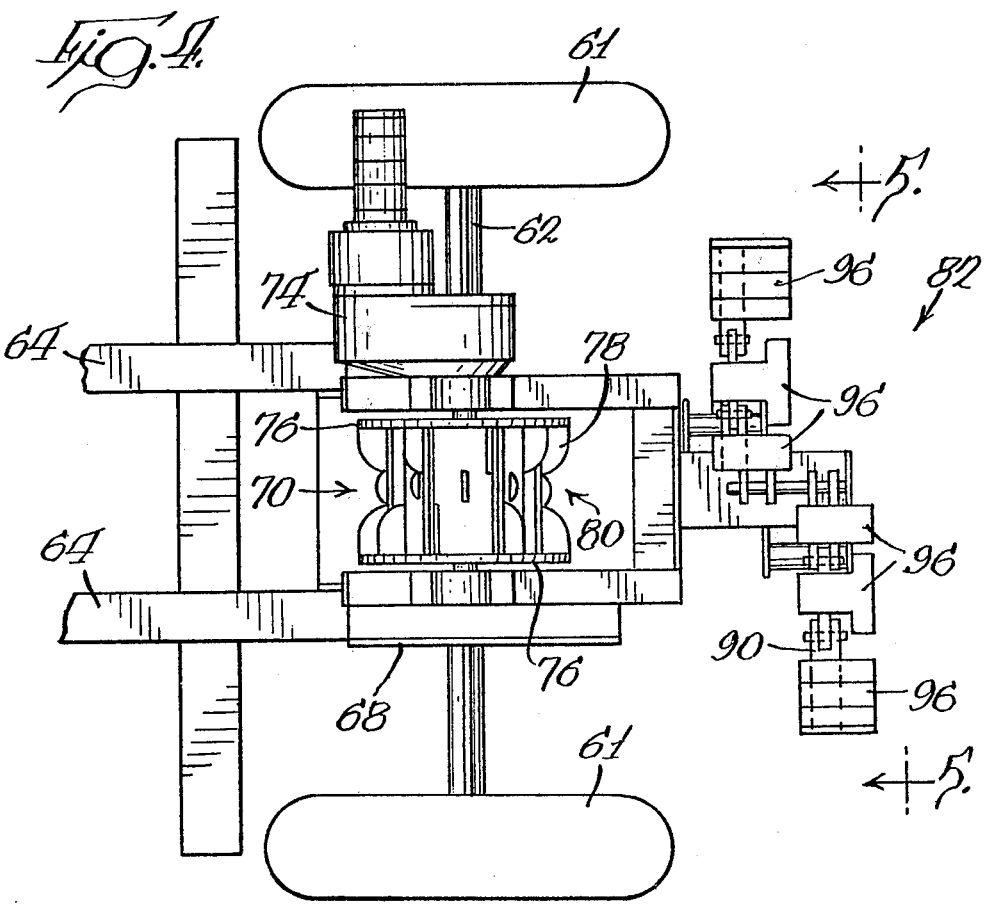

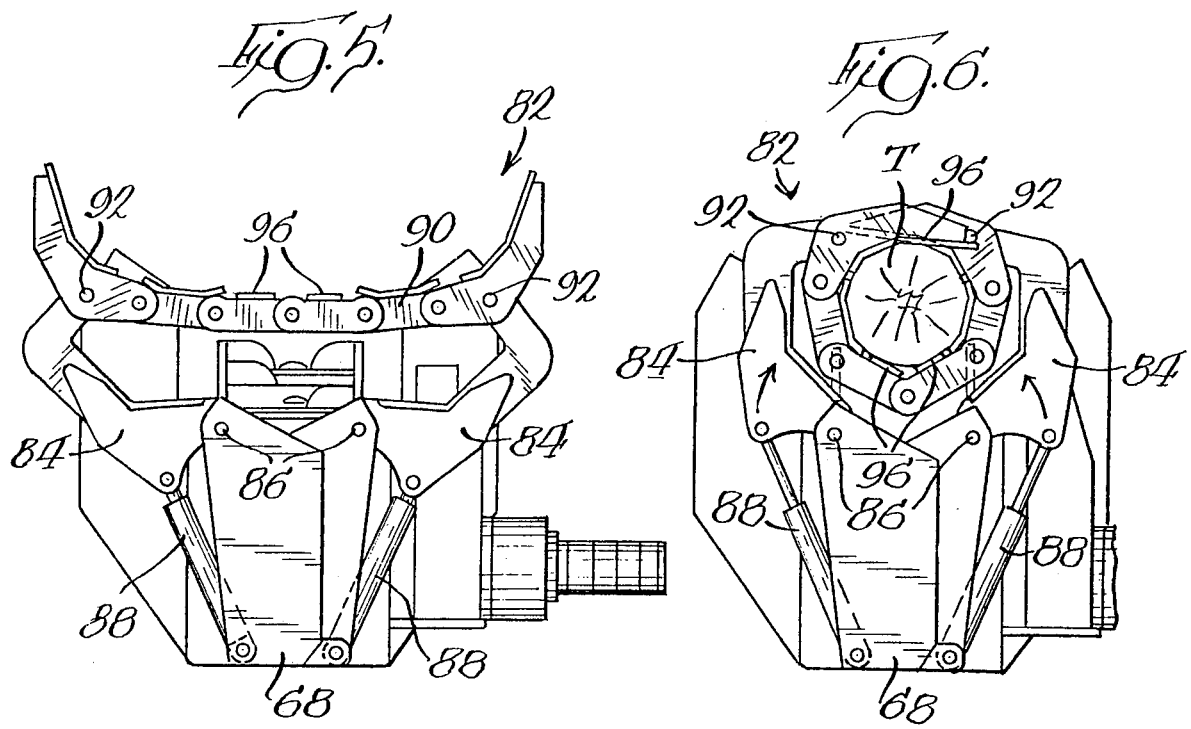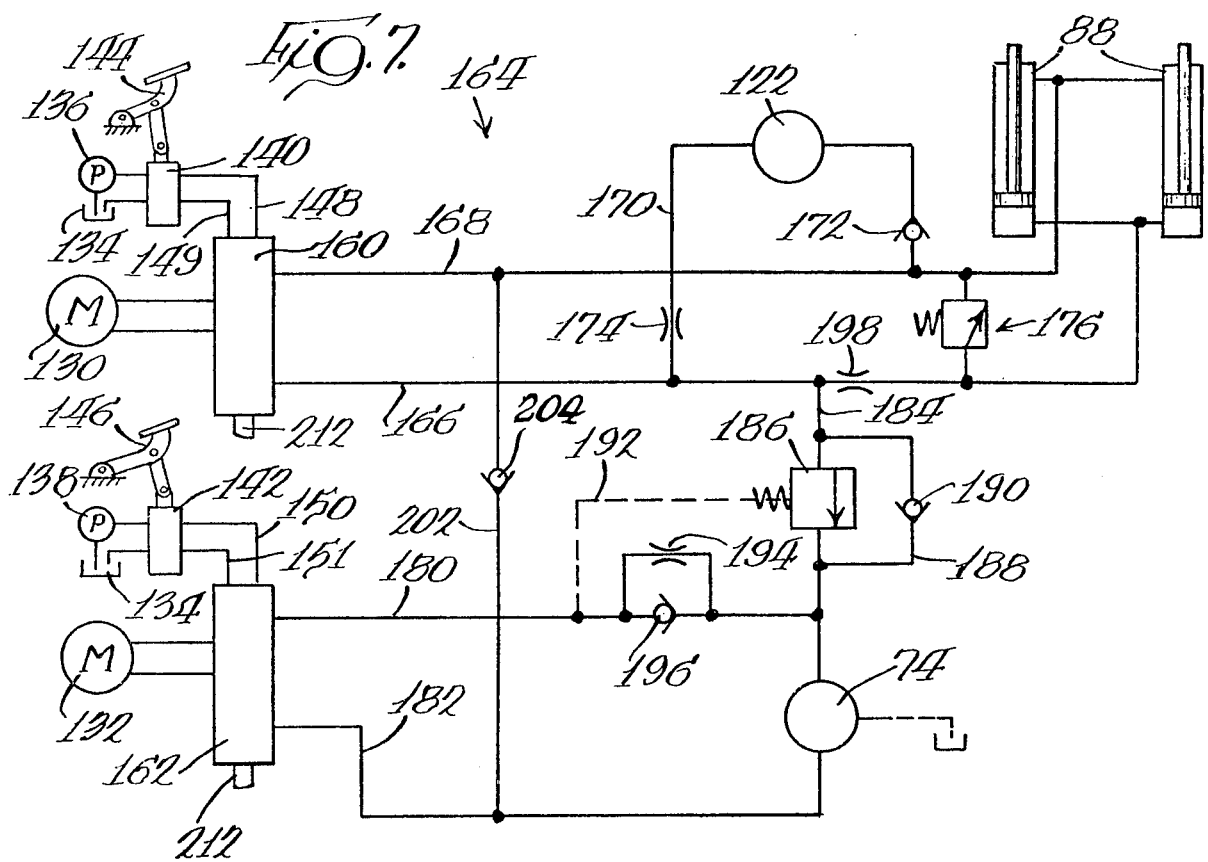

DELIMBING ATTACHMENT FOR TREE HARVESTING APPARATUS

This a division of application Ser. No. 517,461, filed 10-24-74, now U.S. Pat. No. 3,939,886.

BACKGROUND OF THE INVENTION

Various types of tree cutting and processing apparatus have developed in recent years. Many of these devices also incorporate some type of mechanism for delimbing the tree and/or cutting the tree into a plurality of sections. Examples of such devices are shown in the following U.S. Pat. Nos. Propst, 3,140,736; Gutman et al., No. 3,669,161; Siiro, 3,461,928; Maradyn, 3,498,350; and Gibson, 3,542,099. While virtually all of these devices are capable of performing the numerous operations such as delimbing, the topping of trees, the cutting of trees, etc., manufacturers of such equipment are constantly striving to provide a machine that is simple in construction yet highly effective in operation at a minimum cost.

SUMMARY OF THE INVENTION

According to the present invention, a simple and inexpensive processing attachment may be provided for a tree harvesting machine of the type that is self-propelled and wherein a portion of the harvesting mechanism can be utilized in delimbing and cutting the tree into sections.

More specifically, the processing attachment is in the form of a trailer that has a tree advancing roll supported thereon and a tree delimbing mechanism adjacent the tree advancing roll. The trailing vehicle is positioned so that the cutting mechanism used for the initial severing of the tree at its base may also be utilized for cutting the trees into sections after it has been delimbed. Also, the hydraulic mechanism forming part of the boom that supports the tree cutting mechanism can be utilized as the power source for holding the tree into engagement with the advancing roll.

In addition, the present invention contemplates utilizing the existing hydraulic circuit, which is utilized for propelling the vehicle, as the power source for the delimbing and tree advancing mechansims. This is accomplished by a simple diverter valve incorporated into the basic hydraulic circuitry for the vehicle.

BRIEF DESCRIPTION OF THE SEVERAL VIEWS OF THE DRAWINGS

FIG. 1 of the drawings shows the tree harvester and processor of the present invention;

FIG. 2 is an enlarged view of the processing portion of the mechanism shown in FIG. 1;

FIG. 3 is a transverse sectional view as viewed along line 3—3 of FIG. 2;

FIG. 4 is a partial plan view, along line 4—4 of FIG. 2, showing the delimbing and tree advancing mechanism;

FIG. 5 is an end view, as viewed along line 5—5 of FIG. 4 showing the delimbing mechanism;

FIG. 6 is a view similar to FIG. 5 showing the delimbing mechanism in a closed position; and FIG. 7 is a schematic illustration of the novel hydraulic circuits forming part of the present invention.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

While not limited to any specific details, many of the parts of the present tree harvester may be of the type disclosed in U.S. Pat. No. 3,575,222, the portions of which are not inconsistent with this disclosure, being incorporated herein by reference. Tree harvesting apparatus 10, shown in FIG. 1 consists of a vehicle 12 having a base or undercarriage 14 supported by a pair of driven tracks 16, only one of which is shown in FIG. 1. A turntable 18 is rotatably supported about a vertical pivot axis on undercarriage or base 14 and turntable 18 has an overhead assembly 20 supported thereon. Overhead assembly 20 has the inner end of boom 22 pivotally supported about a horizontal pivot axis, defined by pin 24 thereon, and pivoted axis 24 through a fluid ram 26. A dipper stick assembly 30 is pivoted about a pivot pin 32 on the outer end of boom 22 by a further fluid ram 34. Boom 22 and dipper stick assembly 30 may be considered boom sections of an articulated boom that is power actuated by fluid ram 34.

An elongated mast 36 is pivotally supported by a pivot pin 38 on the outer end of the dipper stick or boom section 30 by a further fluid ram 40 with a linkage 42 interposed between fluid ram 40, boom section 30, and mast 36.

The elongated mast 36 incorporates tree gripping means 46 and trees severing means 48 which are respectively capable of gripping the tree and holding the tree by the gripping means while the severing means serves the standing tree adjacent its base. Tree gripping means 46 may be of the type disclosed in the above mentioned Tucek patent wherein the gripping means consists of a pair of arms 50 and 52 that are respectively pivoted on mast 36 at vertically spaced points by fluid rams (not shown). The two gripping means or arms 50 and 52 define opposed jaws for grasping a tree therebetween.

Severing means 48 again can be of the type disclosed in the above mentioned Tucket patent which shows the severing means as being a pair of blades pivoted on mast 36 by a single hydraulic fluid ram.

With the structure so far described, fluid rams 26, 34 and 40 may be manipulated so that elongated mast 36 is positioned generally parallel to a standing tree, adjacent the base thereof, with arms 50 and 52 respectively located on opposite sides of the standing tree while the severing means is in an open position for receiving the base of the tree. The fluid rams assocated with the respective arms 50 and 52 can then be actuated to securely grip the tree and the severing means subsequently be actuated to sever the standing tree adjacent its base. All of the above is accomplished, as explained more fully in the above mentioned Tucek patent.

According to the present invention, the existing apparatus for cutting trees can readily be converted into a machine for also delimbing the trees after they are cut and then cutting the trees into a plurality of sections. All of this may be accomplished by a simple processing attachment or trailer that can be attached to the main vehicle 12 when delimbing and cutting of the tree into section is desired.

More specifically, processing attachment 60 consists of a pair of wheels 61 supported on opposite ends of an axle 62. A tongue structure 64 extends from axle 62 with a conventional releasable attachment 66 at the forward end of tongue 64 for attaching the trailer to undercarriage 14. A frame member 68 is secured to axle 62 and has a tree advancing roller 70 rotatably supported thereon by a shaft 72 which has drive means in the form of a hydraulic motor 74 (FIG. 4) secured thereto.

Tree advancing roll 70 may take any number of forms but preferably includes a pair of plates 76 with a cradle structure 78 between the plates that generally define a generally arcuate peripheral surface when viewed as shown in FIG. 4. The elements defining cradle structure may be in the form of plates that have sharp edges for penetrating the periphery of the tree, as will be described later.

Processing attachment 60 also has tree delimbing means 82 thereon adjacent tree advancing means 70. Again, tree delimbing means 82 may take various forms but preferably is of the type shown in FIGS. 5 and 6 which includes a pair of jaws 84 respectively pivot pins 86 on frame member 68 through fluid rams 88. The two jaws 84 have an endless chain 90 supported thereon by pivot pins 92 so that actuation of fluid rams 88 from the position shown in FIG. 5 to that shown in FIG. 6 will completely encircle a tree T. Chain 90 has a plurality of blades 96 secured to the respective links for severing branches from the main trunk of the tree, as will be described later. The advantage of the link chain arrangement for the delimbing means is that the mechanism encircling the tree can readily conform to the peripheral configuration of the tree. Furthermore, by utilizing hydraulic fluid ram 88, pressurized fluid can continuously be supplied to the rams so that the size of the opening within endless chain 90 automatically decreases as the diameter of the tree T decreases. This has the advantage of automatically maintaining blades 96 as close as possible to the periphery of the trees so that the limbs or branches are removed in close proximity to the tree trunk.

According to one aspect of the invention, the articulated boom consisting of boom sections 22 and 30 as well as fluid ram 34 may be utilized for pressing the tree trunk into contacting engagement with the tree advancing roll 70. For this purpose, mast 36 has tree engaging means 100 defined thereon for engaging the periphery of the tree at a point directly opposite the point of engagement by tree advancing roll 70. Tree engaging means 100 may include fixed or rotatable pipes 102 supported on a frame element 104 secured to mast 36.

With this arrangement, manipulation of fluid rams 26, 34 and 40 can readily locate mast 36 adjacent roll 70 and the power articulated boom including fluid ram 34 or fluid ram 26 can be utilized for providing a large amount of force for forcing the periphery of the tree into engagement with tree advancing roll 70. Another advantage of the arrangement described above is the fact that the tree serving means 46 can be utilized for serving the tree into individual sections after the limbs have been removed.

According to another aspect of the invention, the tree sections which are severed by severing means 46 are automatically moved transversely to be stacked in a common stack for a given tree. Referring to FIGS. 2 and 3, stacking apparatus 110 includes an endless conveyor 112 supported on processor or frame 60, more specifically tongue structure 64 with the upper flight of the conveyor 112 extending transversely of the elongated frame 60. Conveyor 112 consists of a plurality of slats 114 extending between chain flights 115 which are supported on drive sprockets 116 and adjustable idler sprockets 118, the latter of which may be adjusted by fluid rams 120. Drive sprockets 116 are again preferably driven by a hydraulic motor 122, for a purpose that will be described later.

Tree harvesting apparatus 10 also incorporates means 130 for indicating the length of various tree sections. Indicating means 130 consists of telescoping rods 132 and 134, one of which is fixed with respect to frame 60 and the other of which is adjustable relative thereto. The end of rod 134 has a bar extending transversely therefrom with a plurality of chain 138 extending from bar 136. With this arrangement, the operator can readily visualize when a desired length of tree section has been moved through the delimbing mechanism, as will be described later.

Before describing the operation of the trees harvesting apparatus, the novel hydraulic circuit must be described. The novel hydraulic circuit, according to the present invention, utilizes hydraulic fluid that is normally used for propelling the vehicles as the fluid source for operating the tree advancing roll and the delimbing rams 88 as well as conveyor motor 122.

Vehicle 12 incorporates first and second hydraulically operated fluid motors 130 and 132 (FIG. 7) that respectively cooperate with tracks 16 for propelling and controlling the direction of the vehicle. Fluid is supplied to the respective motors from a source 134 through separate pumps 136 and 138 and the flow of fluid to and from the motors is controlled by individual valves 140 and 142. Valves 140 and 142 are normally operated by separate foot pedals 144 and 140 so that the amount and direction of fluid under pressure through conduits 148, 149 150 and 151 can be controlled.

According to the present invention, pumps 136 and 138 are utilized for supplying the fluid to the processing portion of the tree harvesting apparatus. More specifically, conduits 148 and 149 as well as conduits 150 and 151 respectively have diverter valves 160 and 162 located therein. The two diverter valves diverting valve means which, when actuated, supply fluid under pressure from pumps 136 and 138 to fluid rams 88, and fluid motors 74 and 122 through a hydraulic circuit 164 that will now be described.

Hydraulic circuit 164 includes first and second conduits 166 and 168 that respectively lead from diverter valve 160 to opposite ends of fluid rams 88. First conduit 166 has a branch conduit 170 leading therefrom to conveyor motor 122 and from conveyor motor to second conduit 168 with a one-way check valve 172 located therein. Branch conduit 170 also has a restrictor 174 between conveyor motor 122 and first conduit 166. The two conduits 166 and 168 are also interconnected by pressure responsive means 176 that will open when a predetermined pressure is reached in conduit 166 to interconnect the two conduits, for a purpose that will be described later.

Second diverter valve 162 also has conduits 180 and 182 leading therefrom with both conduits connected to the tree advancing motor 74. Motor 74 is a reversible motor and rotates in one direction when fluid under pressure from pump 138 is delivered through conduit 180 and rotates in the opposite direction when fluid under pressure is delivered to conduit 182, which may be accomplished by actuating control valve 142. Conduits 166 and 180 are interconnected through a branch line 184 having a pressure responsive relief valve 186 located therein and a line 188 bypassing pressure responsive relief valve 186 with a unidirectional check valve 190 located therein. Conduits 168 and 182 are also interconnected by a line 202 having a unidirectional valve 204 therein.

Pressure responsive valve 186 is actuated by fluid from conduit 180 passing through line 192 and conduit 180 has a restrictor 194 located therein and a parallel line having a unidirectional valve 196 therein. Also, first conduit 166 has a restrictor 198 located downstream of the connection of branch conduit 184 thereto.

According to one aspect of the invention, diverting valve means 160 and 162 are automatically actuated when the rotatable turntable is in a predetermined position with respect to base 14 and this position is preferably the position illustrated in FIG. 1 wherein the power articulated boom and mast 36 extend generally parallel to elongated frame 60. In this position, a lever or first element 210 engages an actuating element 212 on each of the diverting valves 160 and 162 to move the valves to a position where reservoir 134 and pumps 136 and 138 are connected to the hydraulic circuit for the trailer processor attachment.

OPERATION

The operation of the hydraulic circuits will be described in connection with the overall operation of the tree cutting apparatus and the trailer processor attachment Initially, fluid under pressure is delivered from a source by pumps (not shown) to fluid rams 26, 34 and 40 to position elongated mast 36 alongside the base of a standing tree while clamping jaws 50 and 52 and cutting means 48 are in an open position. The clamping jaws are then moved to a closed position to securely grip the tree and the tree is severed adjacent its base by operating cutting means 48. The severed tree is then reposition to be generally parallel to the ground with the base end above tree advancing wheel or roll 70 while the opposite end of the tree is supported on the ground. When this position is reached, lever 210 actuates both diverting valves 160 and 162 to connect pumps 136 and 138 to hydraulic circuit 164.

Gripping jaws 50 and 52 as well as cutting means 48 are then opened and the tree is supported at its base on driven wheel 70 which at this time is not being driven. The operator then manipulates power articulated boom 22, 30 through fluid ram 34 or fluid ram 26 to force tree engaging means 100 into engagement with the tree at a location directly opposite to the point of contact with tree advancing wheel 70. At the same time or just prior thereto, foot pedal 144 is actuated to supply fluid under pressure from pump 136 through conduit 166 to fluid rams 88 to encircle the tree with delimbing chain 90. The fluid under pressure delivered to conduit 166 also passses through restrictor valve 174, which is preferably adjustable, to drive hydraulic motor 122 in one direction and conveyor 112 in the direction indicated by the arrow in FIG. 3. When the delimbing mechanism fully encircles the tree as shown in FIG. 6, hydraulic pressure rapidly builds up in first conduit 166 and, when the pressure setting of adjustable pressure responsive valve 176 is reached, conduit 166 and 168 will be interconnected so that fluid under pressure from conduit 166 is automatically returned to reservoir 134. The advantage of having adjustable pressure responsive valve means 176 is that the clamping pressure supplied by fluid rams 88 to delimbing mechanism 90 can readily be adjusted.

The second foot pedal 146 is then acutated to supply fluid under pressure through conduit 180 to drive means or motor 74 to rotate tree advancing roll 70 in a generally counterclockwise direction, as viewed in FIGS. 1 and 2, so that the base of the tree is advanced through the delimbing mechanism 82 and the free end thereof is moved toward indicating means 130, more specifically chains 138. During this movement, the hydraulic fluid under pressure from conduit 166 is also utilized for driving fluid motor 74. This is accomplished by pressure responsive valve 186. By having restrictor valve 194 located in conduit 180, there will be a pressure drop across restrictor 194 and the higher pressure side, being connected to pressure responsive valve 186 through conduit 192, will open the valve so that fluid under pressure from pump 136 through conduit 166 will be delivered to motor 74. Again, restrictor valve 198 in conduit 166 will prevent most of the fluid from flowing through pressure responsive bypass valve 176.

When a predetermined length of tree section has passed through the delimbing mechanism 82, which is indicated by the adjustable indicating means 130, pedals 146 and 144 are released so that valves 142 and 140 move to the neutral position which will automatically interrupt flow of fluid from conduit 180 as well as conduit 166 to fluid motor 74. At this time, cutting means 48 is actuated and a tree section TS is severed from the main tree and deposited on conveyor 112. After the severing operation is completed, the hydraulic motors 74 and 122 are again actuated to actuate conveyor 112 while at the same time advancing another tree section through declimbing mechanism 82 to be severed by cutting means 46. During such operation, continued actuation of pedal 144 will continuously supply fluid to the head end of fluid rams 88 so that a clamping pressure will always be applied to endless chain 90 to closely encircle the tree, as the diameter thereof decreases.

The unique hydraulic circuit 164 for tree advancing and tree delimbing mechanism also incorporates many other features that allows the operator to advance the tree without having the declimbing mechanism actuated and reverse the direction of rotation of tree advancing mechanism, should the need arise.

By having the two control valves 140 and 142 respectively controlling the flow to four main conduits, fluid under pressure may be supplied to conduit 168 from pump 136 to open delimbing mechanism while control valve 142 can still be utilized for supplying fluid under pressure to conduit 180 from pump 138. This arrangement may, in certain instances, be desirable as, for example, when a tree has the large knot or other obstruction on the periphery thereof which may be of sufficient size to prevent being severed by delimbing mechanism 82. The separate set of conduits 180 and 182 connected to hydraulic motor 74 may also be utilized for reversing the direction of rotation of motor 74 and thus tree advancing roll 70 by actuating control valve 142 to supply fluid under pressure from pump 138 to conduit 132. In this instance, the fluid under pressure passes through hydraulic motor 74 and then is returned to reservoir 134 through unidirectional valve 196.

At the same time, the fluid under pressure in conduit 182 passes through conduit 202 interconnecting conduits 182 and 168 so that the delimbing rams are automatically actuated in the opposite direction to at least partially open delimbing mechanism 82. This is of course desirable to prevent having the delimbing mechansim become an obstruction in moving the tree in the opposite direction. During such condition of operation for hydraulic circuit 164, fluid motor 122 is prevented from being operated in the reverse direction by unidirectional valve 172.

As can be understood from the above description, the present invention provides a unique processing attachment that can readily be attached to an existing tree harvesting mechanism to convert the mechanism into a unit which is capable of declimbing trees and severing and stacking the trees in sections. Since the entire processing attachment is in the form of a trailer, it can readily be disconnected from the remainder of the harvesting unit if desired.

It should be understood that, while a specific type of cutting and clamping mechanism for the basic harvester have been shown and described as being identical to those disclosed in the above mentioned Tucek patent, it is readily apparent that any other types of servering and gripping mechanisms could be utilized on mast 36.

I claim:

1. A tree processing attachment for use with a detachably mounted tree harvesting apparatus, said tree harvesting apparatus including first means operatively attached thereto with cutter means said tree processing attachment being mounted on said first means, comprising, a trailer including a frame supported by wheels and, a tree advancing roll rotatably supported about an axis on said frame, drive means for rotating said roll, a pair of jaws respectively pivotally supported on said frame by pivot pins extending generally perpendicular to the axis of said roll, a link chain connected at spaced points to the respective jaws at locations spaced from said pivot pins, cutting blades respectively fixed to respective links of said link chain, and drive means between said frame and said jaws for pivoting said jaws between open and closed positions, said link chain encircling a tree supported on said tree advancing roll when in said closed position so that said first means may be utilized to force said tree into engagement with said roll and said cutter means used to sever a tree into tree sections.

2. A tree processing attachment as defined in claim 1, further including indicating means on said frame for indicating the lengths of a tree section that has been advanced by said advancing roll.

3. A tree processing attachment as defined in claim 1 further including a conveyor on said frame, said conveyor extending generally parallel to the axis of said tree advancing roll for receiving and stacking tree sections.

* * * * *

UNITED STATES PATENT OFFICE
CERTIFICATE OF CORRECTION

Patent No. 4,034,785                  Dated July 12, 1977

Inventor(s) Frank J. Tucek

It is certified that error appears in the above-identified patent and that said Letters Patent are hereby corrected as shown below:

Column 1, line 5, "This a division" should read --This is a division--.
Column 1, line 16, delete "No.".
Column 1, line 68, "circuits" should read --circuit--.
Column 2, line 24, after "pivoted" insert --about pivot--.
Column 2, line 31, delete "the" before "dipper stick".
Column 2, line 39, "serves" should read --severs--.
Column 2, line 48, "Tucket" should read --Tucek--.
Column 2, line 59, after "means" insert --can--.
Column 3, line 2, "section" should read --sections--.
Column 3, line 25, after "respectively" insert --pivoted by--.
Column 3, line 48, delete "the" after "with".
Column 3, line 62, "serving" should read --severing--.
Column 3, line 63, "serving" should read --severing--.
Column 4, line 18, "chain" should read --chains--.
Column 4, line 23, "trees" should read --tree--.
Column 4, line 27, "vehicles" should read --vehicle--.
Column 4, line 38, "140" should read --146--.
Column 4, line 40, insert a comma after "149".
Column 4, line 47, insert --define-- after "valves".
Column 6, line 2, "conduit" should read --conduits--.
Column 6, line 54, insert --the-- after "flow to".
Column 7, line 29, "servering" should read --severing--.

UNITED STATES PATENT OFFICE
CERTIFICATE OF CORRECTION

Patent No. 4,034,785      Dated July 12, 1977

Inventor(s) Frank J. Tucek

It is certified that error appears in the above-identified patent and that said Letters Patent are hereby corrected as shown below:

Column 8, claim 1, delete the first seven lines and insert the following:
    --A detachably mounted tree processing attachment for use with a tree harvesting apparatus, said tree harvesting apparatus including first means operatively attached thereto with cutter means being mounted on said first means, said tree processing attachment comprising, a trailer including a frame supported by wheels and a tree advancing roll rotatably supported about an--.

Column 8, claim 3, insert a comma after "claim 1".

*Signed and Sealed this*

*Eighth* Day of *November 1977*

[SEAL]

*Attest:*

RUTH C. MASON
*Attesting Officer*

LUTRELLE F. PARKER
*Acting Commissioner of Patents and Trademarks*